(12) United States Patent
Kessler et al.

(10) Patent No.: US 7,170,999 B1
(45) Date of Patent: Jan. 30, 2007

(54) METHOD OF AND APPARATUS FOR ENCRYPTING AND TRANSFERRING FILES

(75) Inventors: Edward Kessler, Los Gatos, CA (US); Jordan Mendelson, San Francisco, CA (US)

(73) Assignee: Napster, Inc., Santa Clara, CA (US)

( * ) Notice: Subject to any disclaimer, the term of this patent is extended or adjusted under 35 U.S.C. 154(b) by 780 days.

(21) Appl. No.: 10/232,194

(22) Filed: Aug. 28, 2002

(51) Int. Cl.
*H04L 9/00* (2006.01)
(52) U.S. Cl. .................. 380/277; 380/278; 380/283; 380/284; 380/285; 380/44; 380/201; 380/202; 380/203; 713/151; 713/165; 713/167; 713/171; 713/189; 713/193
(58) Field of Classification Search ............. 380/277, 380/278–286, 201–203, 44; 705/51, 57–59; 713/165–171, 151, 189–193
See application file for complete search history.

(56) References Cited

U.S. PATENT DOCUMENTS

| | | | |
|---|---|---|---|
| 6,834,346 B1* | 12/2004 | Ishibashi et al. | 713/179 |
| 2001/0042124 A1* | 11/2001 | Barron | 709/227 |
| 2003/0108205 A1* | 6/2003 | Joyner et al. | 380/277 |

\* cited by examiner

*Primary Examiner*—Kim Vu
*Assistant Examiner*—Baotran N. To
(74) *Attorney, Agent, or Firm*—Martine Penilla & Gencarella, LLP

(57) ABSTRACT

A peer-to-peer connection is established by a receiving computer with a sending computer on which a desired file is located. The sending computer encrypts the file using a track key specifically generated for this particular file transfer. Once encrypted, the encrypted file is preferably obfuscated. An application server sends a public key specific to the receiving computer to the sending computer. The sending computer encrypts the track key using the public key associated with the receiving computer, and the sending computer sends the encrypted track key and the encrypted file to the receiving computer. The receiving computer stores the received encrypted track key and the received encrypted file as a secured file on the receiving computer. When a file is transferred, associated business rules are also transferred to the receiving computer. Business rules act to restrict the extent to which a file is read, copied, or distributed.

118 Claims, 8 Drawing Sheets

METHOD OF AND APPARATUS FOR ENCRYPTING AND TRANSFERRING FILES

FIELD OF THE INVENTION

This invention relates to the field of encrypting data. More particularly, this invention relates to the field of encrypting and transferring files within a peer-to-peer environment.

BACKGROUND OF THE INVENTION

Digital Rights Management (DRM) is a system for protecting the copyrights of digital content that is distributed on-line. It may also include the accounting for paying royalties to the authors of the material. In the music world, a DRM system provides a container format that includes metadata, such as track titles, and a set of business rules that enforce copyright compliance which software and hardware players must support in order to play back the material.

In today's commercial systems, digital music to be distributed is encrypted and stored on download servers. When a user desires to download a particular music file, the download server generates encryption keys for each transfer. The download server sends the digitized encrypted music file and the encrypted key specific for that transaction to the user. The user can then decrypt the encrypted music file for use. Business rules associated with the downloaded music file determine the extent to which the music file is played, copied, or further distributed. In this manner, unauthorized copying or sharing of the music file is restricted. Unfortunately, this client-server distribution model requires that all digital content to be distributed reside on the server.

With the proliferation of the Internet, distributed databases and peer-to-peer networks continue to grow. Such growth has led to widespread file sharing where the data to be transferred resides on distributed client computers. These distributed client computers can be part of a client-server or peer-to-peer environment. Distributed file sharing eliminates the need for desired content to be centrally located, as in the client-server distribution model described above. In most distributed file sharing environments, an application server is utilized to provide a centralized listing of available content. However, as opposed to the central location model, only the list of contents is centrally located on the server, not the content itself. In the distributed environment, a user can search the application server for desired content by searching the content list. The server provides the user with the specific address of another user that has the desired content. The two users then establish a client-to-client connection and transfer the file containing the desired content. A conventional distributed file sharing environment is illustrated in FIG. 1. A client computer 10 and a client computer 20 are coupled to a server 30. The client computers 10 and 20 typically include files containing digital content to be shared. The server 30 includes a list of files to be shared that reside on the client computer 10 and the client computer 20. For simplicity, only two client computers are illustrated in FIG. 1. It should be clear that typical distributed file sharing environments are composed of many more than two client computers. A user of client computer 20 searches the list of contents provided by the server 30 for a desired file. Once the user finds the desired file, the server 30 can provide the location of the desired file, which in this case is client computer 10. The server 30 notifies the client computer 10 to send the desired file to client computer 20, and the server 30 notifies the client computer 20 that the desired file is going to be sent by the client computer 10. The client computer 20 then establishes a connection with the client computer 10, such as a peer-to-peer connection, and the client computer 10 then sends the desired file to client computer 20 over the client-to-client connection. The desired file is now stored on both the client computer 10 and the client computer 20. This method of distributed file sharing does not provide a manner in which file sharing can be regulated. What is needed is a way to restrict file sharing from one peer to another peer. What is also needed is a way to apply a secure file sharing method similar to the central location distribution model within a distributed file sharing environment.

SUMMARY OF THE INVENTION

A system for and method of securely transferring files within a distributed environment includes client computers loaded with proprietary software capable of performing secure file transfers. Preferably, the distributed environment is a peer-to-peer environment. The client computers are each registered with and coupled to an application server. The server provides listings of indexed files available for transfer within the peer-to-peer environment and the associated registered client computers on which each file resides. A peer-to-peer connection is established by a receiving computer with a sending computer on which a desired file is located. The sending computer encrypts the file using a track key specifically generated for this particular file transfer. Preferably, the track key is generated by the sending computer. Alternatively, the track key is generated by the server and sent over a secure communication channel to the sending computer. Once encrypted, the encrypted file is preferably obfuscated. Preferably, the application server sends a public key specific to the receiving computer to the sending computer. Alternatively, the receiving computer sends its public key to the sending computer. The sending computer encrypts the track key using the public key associated with the receiving computer, and the sending computer sends the encrypted track key and the encrypted file to the receiving computer. The receiving computer preferably stores the received encrypted track key and the received encrypted file as a secured file on the receiving computer.

The server also includes business rules associated with each registered user and/or registered file. Business rules act to restrict the extent to which a file is read, copied, or distributed. These business rules are adaptable so that different business rules can be applied to each user and/or file. Track properties are used to encode the business rules. When a file is transferred from the sending computer to the receiving computer, the server ensures that any associated track properties are also transferred to the receiving computer. The transferred track properties are preferably stored with the associated secured file on the receiving computer.

DETAILED DESCRIPTION OF THE PREFERRED EMBODIMENT OF THE PRESENT INVENTION

Figure 1:
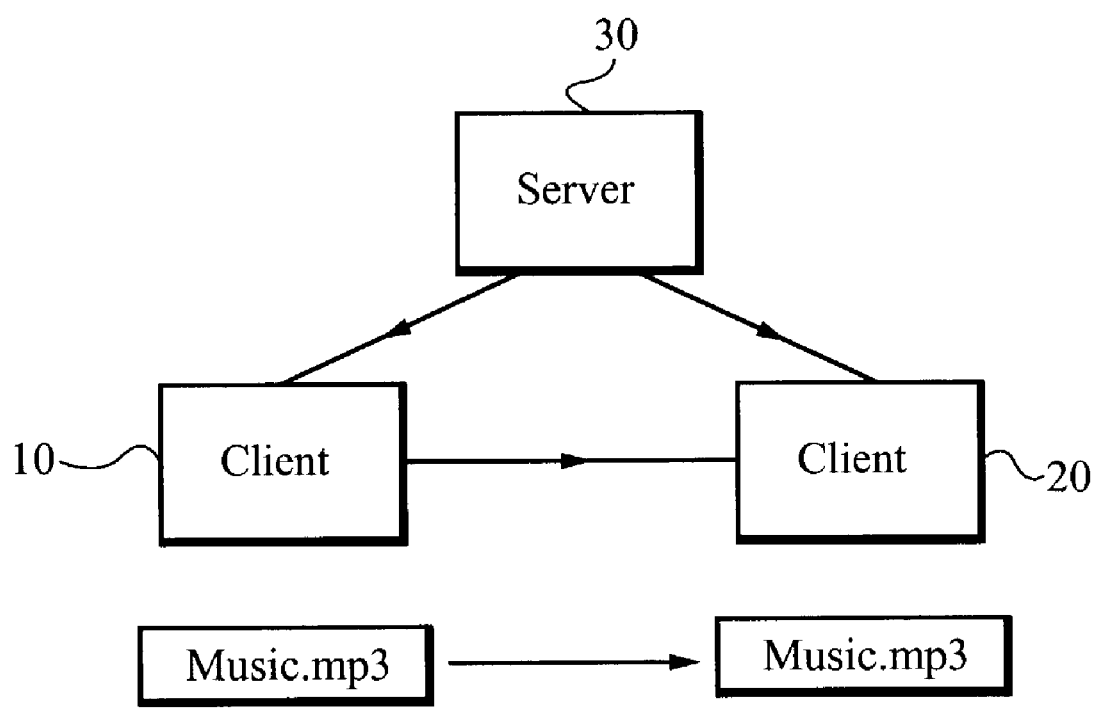
FIG. 1 illustrates a conventional distributed file sharing environment.

A system for and method of securely transferring files within a distributed environment includes client computers loaded with proprietary software capable of performing secure file transfers. Preferably, the distributed environment is a peer-to-peer environment. Alternatively, the distributed environment includes any type of computer that has data to be securely shared over a distributed network. The client computers are coupled to an application server. The server provides listings of indexed files available for transfer within the distributed environment and the associated client computers on which each file resides. Each client computer in the distributed environment is registered with the server. Preferably, the server is centrally located although it should be clear that the server can also be distributed. A registered client computer searches the list of indexed files on the server for a file or files to be shared. Once the client computer finds a desired file, the server provides access information regarding the specific address of a sending computer that has stored the desired file. The client computer requesting the desired file is hereinafter referred to as the receiving computer.

As registered client computers, each computer within the distributed environment receives proprietary software to facilitate the file transfer process. Each registered client computer that wants to share a file indexes that file with the server. The server does not maintain a stored version of the file, simply a listing and a location of the file.

Once a desired file to be shared is located by the receiving computer, a client-to-client connection is established by the receiving computer with the sending computer. The sending computer encrypts the file using a track key specifically generated for this particular file transfer. Preferably, the track key is generated by the sending computer. Alternatively, the track key is generated by the server and sent over a secure communication channel to the sending computer. Preferably, the server sends a public key specific to the receiving computer to the sending computer. The server maintains a database that includes a public key and a secret key for each registered client computer. The sending computer encrypts the track key using the public key associated with the receiving computer, and the sending computer sends the encrypted track key and the encrypted file to the receiving computer. The receiving computer preferably stores the received encrypted track key and the received encrypted file as a secured file stored on the receiving computer.

The server also includes business rules associated with each registered user and/or registered file. Business rules act to restrict the extent to which a file is read, copied, or distributed. These business rules are adaptable so that different business rules can be applied to each user and/or file. Track properties are used to encode the business rules. When a file is transferred from the sending computer to the receiving computer, the server ensures that any associated track properties are also transferred to the receiving computer. Preferably, the transferred track properties are stored with the associated secured file on the receiving computer. Each secure file preferably includes a header portion and a data portion. The header portion is preferably used to store the encrypted track key. The data portion is preferably used to store the encrypted file. Preferably, the encrypted file is segmented so that it can be randomly accessed, for example by skipping forward or backward during playback. Metadata and track properties are associated with the encrypted file stored in the data portion. Preferably, the metadata and track properties are encrypted and stored in the header portion. Alternatively, either the metadata, the track properties, or both are encrypted and stored separately from the associated secure file.

Preferably, files transferred according to embodiments of the present invention are audio files. Preferably, each audio file is formatted in the MP3 format. It is understood that the audio file can be a non-MP3 formatted audio file. Other supported formats include, but are not limited to, Ogg Vorbis, WMA (Windows Media Audio), AAC (Advanced Audio Coding) and ATRAC-3. It is also understood that the file can be any type of media file including, but not limited to, audio, video, image, and electronic text.

Figure 2:
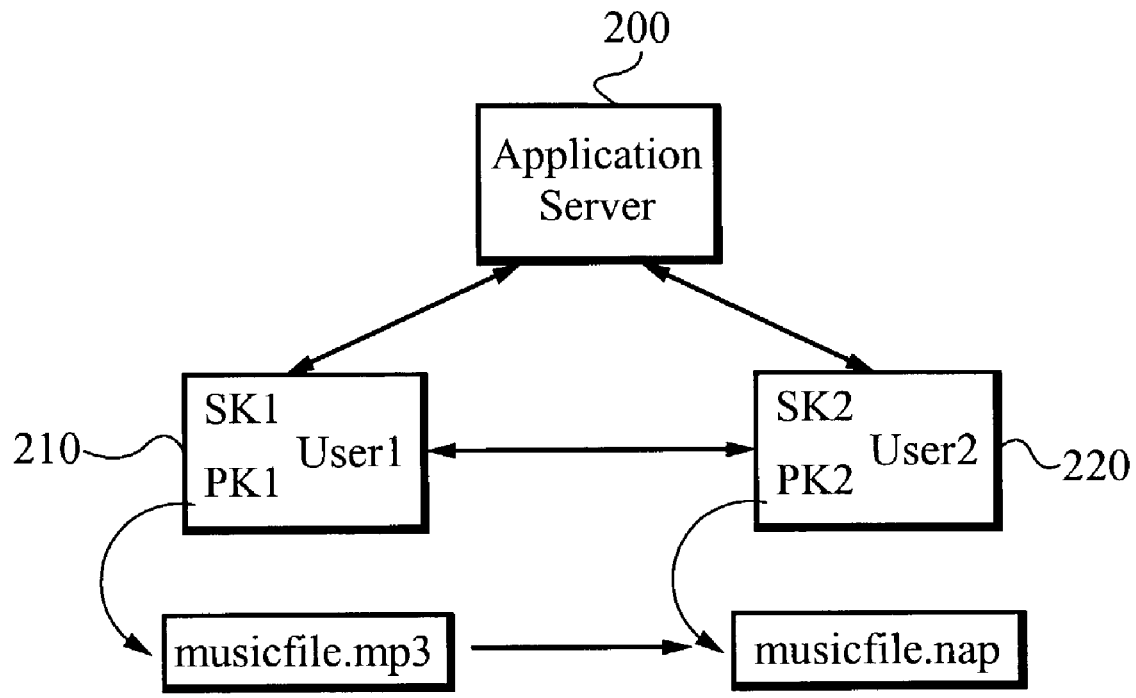
FIG. 2 illustrates peer-to-peer file sharing within a secure environment according to the preferred embodiment of the present invention.

FIG. 2 illustrates a secure peer-to-peer file sharing environment according to the preferred embodiment of the present invention. An application server 200 is coupled to a client computer 210 and a client computer 220 via secure communication channels. A User 1 uses the client computer 210 and a User 2 uses the client computer 220. For simplicity, only two client computers are illustrated in FIG. 2. It should be clear that the peer-to-peer file sharing environment of the present invention is composed of many more than two client computers. Each client computer included in the peer-to-peer file sharing environment must register with the application server 200. As part of the registration process, the client computer receives proprietary client software for facilitating the file sharing process. The client software includes a unique secret key, SK, and a unique public key, PK, for each registered client computer. The secret key and the public key are both stored in a database maintained by the server and at the registered client computer. The PK of a receiving computer is preferably provided by the server to a sending computer within the peer-to-peer file sharing environment when data is to be transferred from the sending computer to the receiving computer. The data to be transferred is encrypted using the public key, PK, of the receiving computer. Once the receiving computer receives the encrypted data, the secret key, SK, of the receiving computer is used to decrypt the data. The secret key and the public key are embedded within the client software such that neither are accessible by the user of the client computer. Such secure measures prevents unauthorized use of the secret key to decrypt the transferred data.

Referring to FIG. 2, client computer 210 includes secret key, SK1, and public key, PK1. Similarly, client computer 220 includes SK2 and PK2. User 1 has a music file, musicfile.mp3, to be indexed by the application server 200. Once the music file is indexed, the music file is available to be transferred to other registered users within the peer-to-peer file sharing environment. The music file is preferably formatted in the MP3 format indicated by .mp3, and stored as musicfile.mp3 on client computer 210. To index musicfile.mp3, client computer 210 and application server 200 preferably establish a protected channel for secure communications. Indexing does not provide a copy of musicfile.mp3 to the application server 200. Instead, the indexing process notifies the application server 200 that musicfile.mp3 is available for transfer and that it resides on client computer 210. In this manner, the application server 200 maintains a list of all files available for transfer within the peer-to-peer file sharing environment. The file transfer list is organized into an index that includes the names of the files and the client computers on which the files reside.

User 2 accesses the application server 200 and searches the file transfer list. When User 2 finds a file to transfer, in this case musicfile.mp3, User 2 makes a transfer request to the application server 200 for musicfile.mp3. In response to the request, the application server 200 notifies User 1 that a file transfer request for musicfile.mp3 has been initiated by User 2. User 1 transmits a transfer approval to the application server 200. The transfer approval is then transmitted to User 2 along with address information associated with musicfile.mp3, which includes the address of User 1. User 2 then initiates a peer-to-peer connection with User 1. Alternatively, User 1 can initiate the peer-to-peer connection with User 2.

User 1 generates a track key, TK, for this particular file transfer. User 1 encrypts the musicfile.mp3 using TK. To maintain control of the file sharing process, TK is also encrypted to prevent User 2 from receiving TK and distributing TK and the encrypted musicfile.mp3 in an unauthorized manner. To encrypt TK, PK2 is preferably sent by the application server 200 to the User 1. Alternatively, User 2 sends PK2 to User 1. Preferably, User 1 encrypts TK using PK2. Alternatively, the application server 200 encrypts TK using PK2. Encrypted data is represented in the form E(X,Y) where Y is the data that is encrypted and X is the encryption key used to encrypt the data. Therefore, the encrypted TK is represented by E(PK2, TK) and the encrypted music file musicfile.mp3 is represented by E(TK, musicfile.mp3).

E(PK2, TK) and E(TK, musicfile.mp3) are sent to User 2. When sending E(PK2, TK) and E(TK, musicfile.mp3) from User 1 to User 2 over the peer-to-peer connection, envelope encryption is preferably used as an additional security measure. Envelope encryption is a network layer encryption, as is well known in the art. Envelope encryption is used because not all data sent over the peer-to-peer connection is encrypted. In this case, a business rule is created that permits data files to be transferred from User 1 to User 2 unencrypted. For example, as opposed to sending the encrypted E(PK2, TK) and E(TK, musicfile.mp3), as discussed above, the un-encrypted data file musicfile.mp3 can be sent from User 1 to User 2 over the peer-to-peer connection. So both encrypted and unencrypted data can be sent from sender to receiver. To secure against unauthorized access to an unsecured peer-to-peer connection, and therefore gain access to an unencrypted file, the envelope encryption is added. Envelope encryption applies to both encrypted data and unencrypted data sent over the peer-to-peer connection. This prevents unauthorized interception of the data transfer to distinguish between encrypted and non-encrypted data.

Preferably, an envelope encryption key, EK, is generated by User 1 and sent via the application server 200 to User 2. Alternatively, the application server 200 generates EK and sends EK to User 1 and User 2. As a further alternative, the application server 200 generates EK, sends EK to User 1, and User 1 sends EK to User 2. It is understood that EK is sent over secure communication channels. When sending E(PK2, TK) and E(TK, musicfile.mp3) from User 1 to User 2 over the peer-to-peer connection, User 1 encrypts E(PK2, TK) and E(TK, musicfile.mp3) using EK. The encrypted E(PK2, TK) and E(TK, musicfile.mp3) are then sent to User 2. User 2 decrypts E(PK2, TK) and E(TK, musicfile.mp3) using EK previously sent by User 1, or by the application server 200. The decryption preferably happens on-the-fly as the encrypted E(PK2, TK) and E(TK, musicfile.mp3) are received by User 2. A new EK is generated on-the-fly for each data transfer. EK is not stored in the database maintained by the application server 200, nor is EK stored anywhere after the data transfer is completed. EK is a one-time key used exclusively for a single particular transfer.

Figure 3:
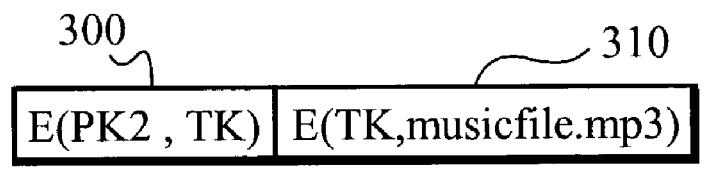
FIG. 3 illustrates a secure file stored by User 2 related to the transfer of data received from User 1.

User 2 creates a secured file used to store the encrypted track key, E(PK2, TK), and the encrypted music file, E(TK, musicfile.mp3). FIG. 3 illustrates a secure file stored by User 2 related to the transfer of the musicfile.mp3 from User 1. In general, the secure file includes a header portion 300 and a data portion 310. The header portion 300 is to include the encrypted track key, E(PK2, TK), and the data portion 310 is to include the encrypted music file, E(TK, musicfile.mp3). Preferably, E(PK2, TK) and E(TK, musicfile.mp3) are serially streamed over the peer-to-peer connection, and User 2 receives E(PK2, TK) first, followed by E(TK, musicfile.mp3) in a memory buffer. To write E(PK2, TK) and E(TK, musicfile.mp3) to the header portion 300 and the data portion 310, respectively, of the secure file within User 2, a blank header is first written into the header portion 300, and then E(TK, musicfile.mp3) is written into the data portion 310. The blank header essentially acts as a place holder. Preferably, the secure file resides within a file system on a hard disk drive. As E(TK, musicfile.mp3) is downloaded to the memory buffer, the portion of E(TK, musicfile.mp3) already received by the memory buffer is preferably written to the data portion 310 of the secure file. Once E(TK, musicfile.mp3) is written into the data portion 310, E(PK2, TK) is written into the header portion 300. Preferably, E(TK, musicfile.mp3) must be completely downloaded and stored in the secure file before E(PK2, TK) is stored in the secure file. By writing the header portion 300 last, the ability to partially download and play the data file, musicfile.mp3, from the secure file is eliminated.

The secure file, including header portion 300 and data portion 310, is represented as a .nap file. In the case where musicfile.mp3 is transferred from User 1 to User 2, the secure file is represented as musicfile.nap. Musicfile.nap is stored on client computer 220, as illustrated in FIG. 2.

To recover the music file stored in the .nap file, the proprietary client software loaded on the client computer 220 reads the header portion 300 of the secure file. Where the secure file is musicfile.nap as described above, the header portion 300 is E(PK2, TK). User 2 uses SK2 to extract TK. TK is then used to decrypt the data portion 310, which in this case is E(TK, musicfile.mp3), to extract the music file, musicfile.mp3. Summarily, two different encryption technologies are used to provide this secure peer-to-peer file sharing environment. The first uses public key encryption to encrypt and decrypt the track key, TK. The second uses symmetric encryption to encrypt and decrypt the music file, musicfile.mp3. Symmetric encryption uses the same key, in this case TK, to both encrypt and decrypt.

While the encrypted version of the musicfile.mp3 stored in the secure file is not playable until the last byte is received and stored in the secure file, the version of the musicfile.mp3 stored in the memory buffer during download is playable using the in-memory header. However, business rules are preferably applied that limit playback of the musicfile.mp3 in the memory buffer to only a portion, or a sample, of the entire musicfile.mp3. This form of playback can also be stopped if the file transfer over the peer-to-peer connection is cancelled or interrupted.

Playback of the musicfile.mp3 occurs while the musicfile.mp3 is being decrypted such that the musicfile.mp3 is never entirely decrypted at one time. In other words, the encrypted file, musicfile.mp3, is not completely decrypted and then played. Instead, a small portion of the encrypted musicfile.mp3 is decrypted in memory and sent to an audio device to be played. Then, a next small portion is decrypted and played, and so on. As each portion is decrypted in memory, the previous portion residing in memory is preferably overwritten. Continuity between each succeeding portion is ensured through proper decrypting, buffering, and timing. In this manner, only a small portion of the encrypted musicfile.mp3 is decrypted at any given time. Since the encrypted musicfile.mp3 is stored as segmented data, each piece of segmented data can be individually accessed. This enables skipping forward and backward during playback.

Figure 4:
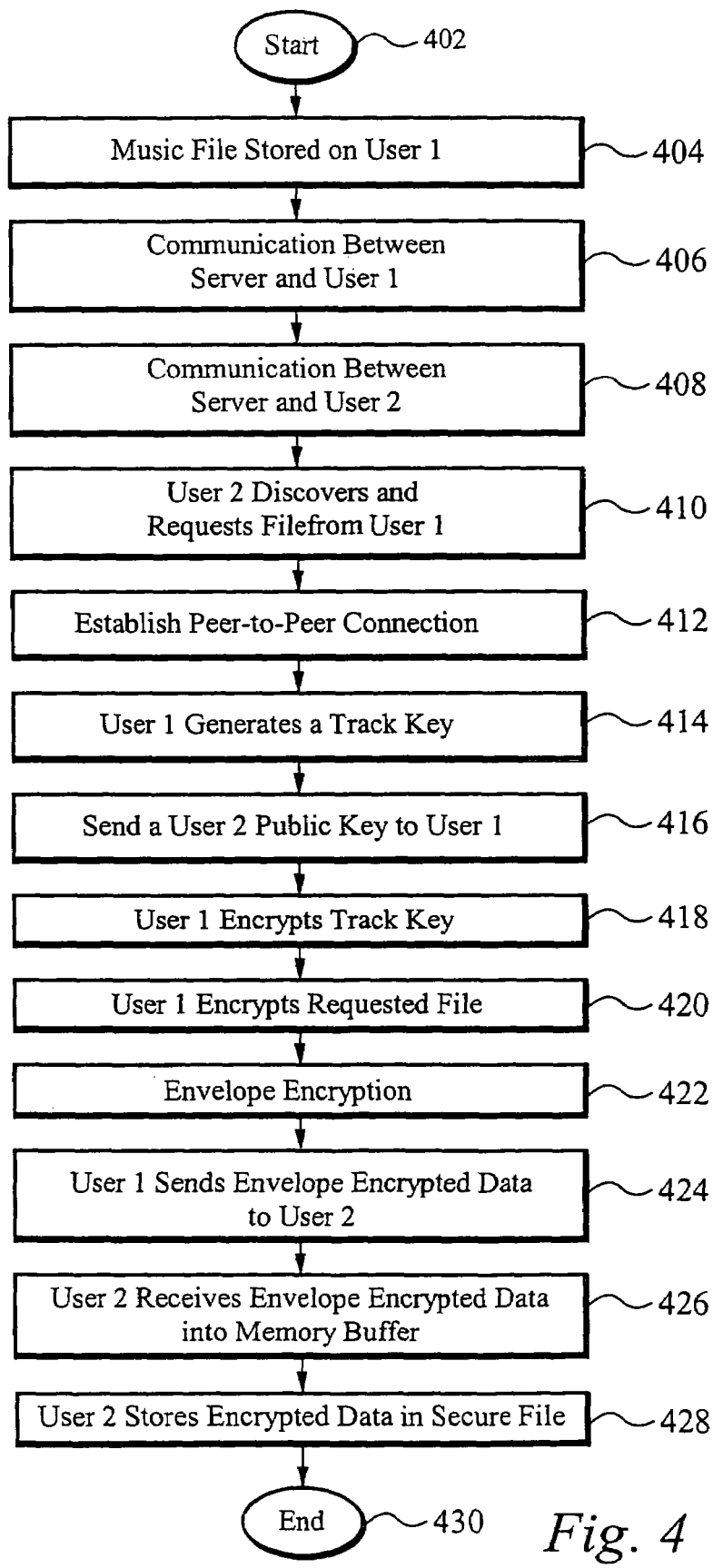
FIG. 4 illustrates a flowchart showing a process of performing a secure peer-to-peer file transfer according to an embodiment of the present invention.

FIG. 4 illustrates a flowchart showing a process of performing a secure peer-to-peer file transfer according to the present invention. The process illustrated in FIG. 4 is a file transfer between a User 1 and a User 2, both previously registered with an application server. As such, the client computers associated with each User 1 and User 2 include proprietary client computer software used to facilitate the secure file transfer between User 1 and User 2. User 1 and User 2 are two of many users within a registered peer-to-peer file sharing environment. The secured peer-to-peer file transfer process begins at the step 402. At the step 404, a music file called beatles.mp3 is stored on the client computer of User 1. At the step 406, a secure communications channel is established between User 1 and the application server. The application server is notified by User 1 that the beatles.mp3 is available as a file to be shared. The application server adds beatles.mp3 to an existing list of all files available for transfer throughout the registered peer-to-peer file sharing environment. At the step 408, a secure communications channel is established between User 2 and the application server. Then, the User 2 accesses the application server to search the list of available files. At the step 410, a desired file is discovered, in this case the beatles.mp3 file, and the User 2 submits a request to the application server for the beatles.mp3. In response to the request, the application server 200 notifies User 1 that a file transfer request for musicfile.mp3 has been initiated by User 2. User 1 transmits a transfer approval to the application server 200. The transfer approval is then transmitted to User 2 along with address information associated with musicfile.mp3, which includes the address of User 1. User 2 then initiates a peer-to-peer connection with User 1 at the step 412. Preferably, User 1 then generates a track key, TK, at the step 414. At the step 416, a User 2 public key, PK2, is sent to User 1. Preferably, PK2 is sent by the application server to User 1 over a secure communication channel. Alternatively, PK2 is sent by User 2 to User 1 in a secure manner. In this alternate embodiment, User 2 preferably sends PK2 to User 1 via the application server where the communication channels between User 2 and the application server, and the application server and User 1 are secure.

At the step 418, User 1 encrypts TK using PK2, thereby forming E(PK2, TK). At the step 420, User 1 encrypts beatles.mp3 using the track key, TK, thereby forming E(TK, beatles.mp3). At the step 422, envelope encryption is used to encrypt E(PK2, TK) and E(TK, beatles.mp3). To perform envelope encryption, User 1 generates an envelope encryption key, EK, and sends EK to User 2 via the application server using a secure communication channel. User 1 uses EK to encrypt E(PK2, TK) and E(TK, beatles.mp3) at the network layer. Alternatively, the application server generates EK and sends EK to User 1 and to User 2 over secure communication channels. As a further alternative, the application server generates EK, sends EK to User 1, and User 1 sends EK to User 2 in a secure manner. At the step 424, User 1 sends the envelope encrypted E(PK2, TK) and E(TK, beatles.mp3) to User 2. At the step 426, User 2 receives the envelope encrypted E(PK2, TK) and E(TK, beatles.mp3) in a memory buffer. As the envelope encrypted E(PK2, TK) and E(TK, beatles.mp3) are received into the memory buffer, the envelope encryption is decrypted using EK sent to User 2 by User 1. At the step 428, E(TK, beatles.mp3) is written to a data portion of a secure file stored on User 2. Once E(TK, beatles.mp3) is completely written to the secure file, E(PK2, TK) is written to a header portion of the secure file. The secured peer-to-peer file transfer process ends at the step 430.

Figure 5:
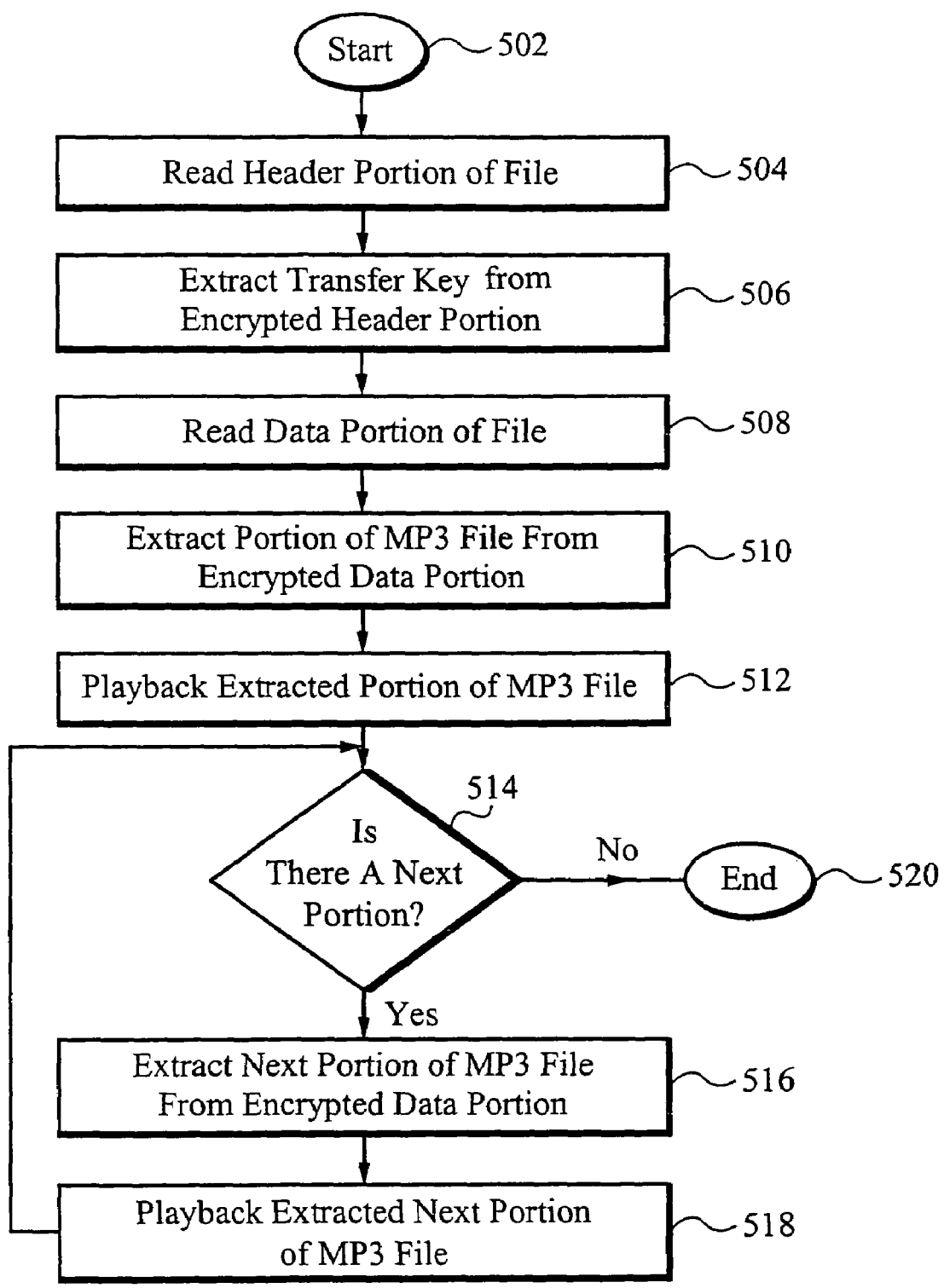
FIG. 5 illustrates a flowchart showing a process of playing the secure file previously transferred within the secure peer-to-peer file sharing environment of the present invention.

FIG. 5 illustrates a flowchart showing a process of playing a secure file previously transferred within the secure peer-to-peer file sharing environment of the present invention. The secure file is played from the client computer on which the secure file was received. The playback process begins at the step 502. At the step 504, the header portion of the secure file is read. At the step 506, the encrypted track key, TK, is extracted from the header portion using a secret key, SK2, associated with the client computer. At the step 508, a first data portion of the secure file is read. At the step 510, a portion of the encrypted music file to be played, beatles.mp3, is extracted from the encrypted first data portion using the track key, TK. At the step 512, the extracted portion of beatles.mp3 is played. At the step 514, it is determined if there is a next portion of beatles.mp3. If there is a next portion, then at the step 516, a next data portion of the secure file is read and the next portion of beatles.mp3 is extracted from the encrypted next data portion using the track key, TK. Preferably, the previous portion is overwritten in memory by the next portion. At the step, 518, the extracted next portion of beatles.mp3 is played and the process returns to the step 514. If it is determined at the step 514 that there is not a next portion of beatles.mp3, then the playback process ends at the step 520.

As previously discussed, each registered client computer receives proprietary client software. The proprietary client software includes the public key, the secret key and the necessary encryption and decryption algorithms. The public key and the secret key are unique to each client computer. To provide additional security, the proprietary client software also includes obfuscation and de-obfuscation algorithms. The obfuscation algorithm employs mathematical transforms that scramble data. Before a file is encrypted using the transfer key, TK, the file is obfuscated. The obfuscation algorithm is the same algorithm on each client computer. The de-obfuscation algorithm is used to de-obfuscate an obfuscated file. The obfuscation algorithm, the de-obfuscation algorithm, the secret key, and the public key are themselves obfuscated and/or encrypted within the proprietary client software used by the client computer. In this manner, users are unable to perform de-obfuscating and decrypting that might lead to unauthorized file sharing.

Figure 6:
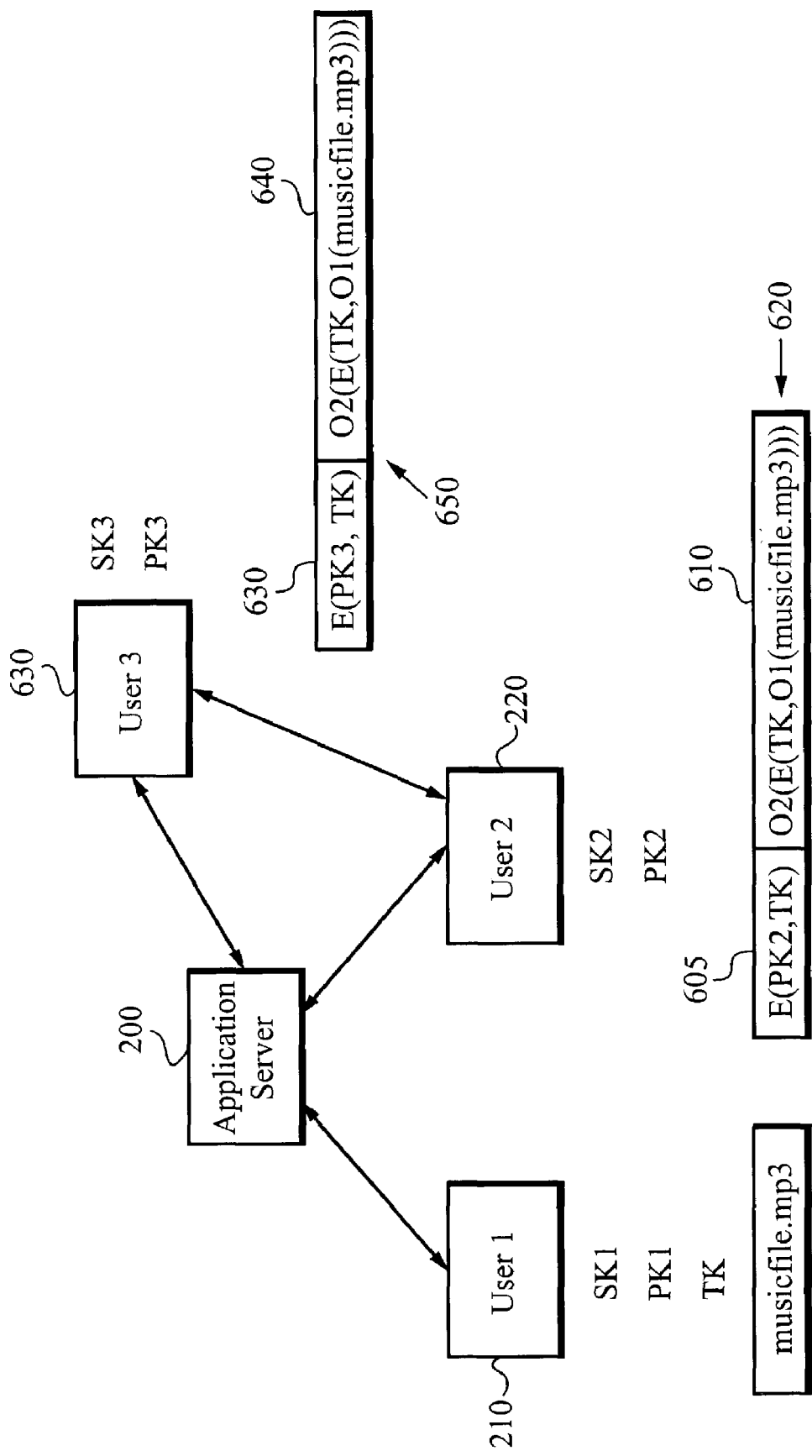
FIG. 6 illustrates peer-to-peer file sharing within a secure environment according to the preferred embodiment of the present invention.

FIG. 6 illustrates peer-to-peer file sharing within a secure environment according to the preferred embodiment of the present invention. FIG. 6 illustrates the same two-peer, single application server configuration shown in FIG. 2 with the addition of a third client computer 630 associated with a User 3. User 3 is a registered user and as such, client computer 630 includes a public key, PK3, and a secret key, SK3. User 1 has a music file, musicfile.mp3, to be indexed by the application server 200. In FIG. 6, musicfile.mp3 is an indexed file 600 that is stored on the client computer 210. The file transfer list is an index maintained by the application server 200 that includes a name of the indexed file 600 and the client computer on which the indexed file 600 is stored, which in this case is musicfile.mp3 stored on client computer 210.

User 2 accesses the application server 200 and searches the file transfer list. When User 2 finds a file to transfer, in this case musicfile.mp3 located on User 1, User 2 makes a transfer request to the application server 200 for musicfile.mp3. In response to the request, the application server 200 notifies User 1 that a file transfer request for musicfile.mp3 has been initiated by User 2. User 1 transmits a transfer approval to the application server 200. The transfer approval is then transmitted to User 2 along with address information associated with musicfile.mp3, which includes the address of User 1. User 2 then initiates a peer-to-peer connection with User 1. In response, User 1 obfuscates musicfile.mp3 using a first obfuscation algorithm An obfuscated music file is represented in the form O(Z) where Z is the data that is obfuscated. Therefore, the obfuscated musicfile.mp3 is represented by O1(musicfile.mp3) where O1 is the first obfuscation algorithm. User 1 then generates a track key, TK, for this particular file transfer. TK is to be used by User 1 to encrypt O1(musicfile.mp3).

User 2 will need the track key, TK, to decrypt the encrypted music file, O1(musicfile.mp3). TK is encrypted by User 1 before being sent to User 2. To encrypt TK, the User 2 public key, PK2, is preferably sent by the application server 200 to User 1. Alternatively, User 2 sends PK2 to User 1. In this alternate embodiment, PK2 is preferably sent by User 2 to User 1 via the application server 200. Preferably, User 1 encrypts TK using PK2. Alternatively, the application server 200 encrypts TK using PK2. The encrypted TK is represented by E(PK2, TK). User 1 then encrypts O1(musicfile.mp3) using TK. The encryption is applied to the obfuscated music file. The encrypted music file is represented as E(TK, O1(musicfile.mp3)). Additionally, once the obfuscated music file, O1(musicfile.mp3), is encrypted, the encrypted music file, E(TK, O1(musicfile.mp3)), is obfuscated by a second obfuscation algorithm, O2, to form O2(E(TK, O1(musicfile.mp3))). E(PK2, TK) and O2(E(TK, O1(musicfile.mp3))) are then sent to User 2.

When sending E(PK2, TK) and O2(E(TK, O1(musicfile.mp3))) from User 1 to User 2 over the peer-to-peer connection, envelope encryption is preferably used as an additional security measure. An envelope encryption key, EK, is preferably generated by User 1 and sent via the application server 200 to User 2. Alternatively, the application server 200 generates EK and sends EK to User 1 and User 2. When sending E(PK2, TK) and O2(E(TK, O1(musicfile.mp3))) from User 1 to User 2 over the peer-to-peer connection, User 1 first encrypts E(PK2, TK) and O2(E(TK, O1(musicfile.mp3))) using EK. The envelope encrypted E(PK2, TK) and O2(E(TK, O1(musicfile.mp3))) are sent to User 2. User 2 decrypts E(PK2, TK) and O2(E(TK, O1(musicfile.mp3))) using its EK previously sent by User 1. The decryption preferably happens on-the-fly as the envelope encrypted E(PK2, TK) and O2(E(TK, O1(musicfile.mp3))) are received by User 2. A new EK is generated on-the-fly for each data transfer. EK is not stored in the database maintained by the application server 200, nor is EK stored anywhere after the data transfer is completed. EK is a one-time key used exclusively for a single particular transfer.

User 2 creates a secured file used to store the encrypted track key, E(PK2, TK), and the encrypted music file, O2(E(TK, O1(musicfile.mp3))). A secure file 620 is illustrated in FIG. 6. The secure file 620 is stored on client computer 220. The secure file 620 includes a header portion 605 and a data portion 610. The header portion 605 is to include the encrypted track key, E(PK2, TK), and the data portion 610 is to include the encrypted music file, O2(E(TK, O1(musicfile.mp3))). Preferably, E(PK2, TK) and O2(E(TK, O1(musicfile.mp3))) are serially streamed over the peer-to-peer connection between User 1 and User 2, and User 2 receives E(PK2, TK) first, followed by O2(E(TK, O1(musicfile.mp3))) in a memory buffer. To write E(PK2, TK) and O2(E(TK, O1(musicfile.mp3))) to the header portion 605 and the data portion 610, respectively, of the secure file within User 2, a blank header is first written into the header portion 605, and then O2(E(TK, O1(musicfile.mp3))) is written into the data portion 610. Preferably, the secure file resides within a file system on a hard disk drive. As O2(E(TK, O1(musicfile.mp3))) is downloaded to the memory buffer, the portion of O2(E(TK, O1(musicfile.mp3))) already received by the memory buffer is preferably being written to the data portion 610 of the secure file. Once O2(E(TK, O1(musicfile.mp3))) is written into the data portion 610, E(PK2, TK) is written into the header portion 605. Preferably, 02(E(TK, O1(musicfile.mp3))) is completely transferred and stored in the secure file before E(PK2, TK) is stored in the secure file. By writing the header portion 605 last, the ability to partially download and play the data file, musicfile.mp3, from the secure file is eliminated. Preferably, the secure file also includes business rules associated with this particular file transfer, which are encrypted and stored in the header portion 605. Business rules are discussed in greater detail below.

The secure file 620, including header portion 605 and data portion 610, is represented as a .nap file. Similar to the indexed file 600, the secure file 620 is also indexed by the application server 200. As such, the file transfer list includes a listing for musicfile on both client computer 210 and client computer 220.

The obfuscation algorithms O1 and O2, and the associated de-obfuscation algorithms DO1 and DO2, are the same on each registered client computer. The algorithms O1, O2, DO1, and DO2 are bound within the proprietary client software loaded onto the registered client computers. The algorithms O1, O2, DO1, and DO2 are themselves obfuscated within the computer code of the proprietary client software.

As a generalized procedure for recovering the music file stored in the secure file 620, the proprietary client software loaded on the client computer 220 reads the header portion 605. The header portion includes E(PK2, TK). User 2 uses SK2 to extract TK. The data portion 610, which includes O2(E(TK, O1(musicfile.mp3))), is then read and de-obfuscated using the de-obfuscation algorithm DO2 to extract the encrypted music file E(TK, O1(musicfile.mp3)). TK is then used to decrypt E(TK, O1(musicfile.mp3)) to extract O1(musicfile.mp3) which is the obfuscated music file. The obfuscated music file, O1(musicfile.mp3), is then de-obfuscated using the de-obfuscation algorithm DO1 to extract the music file, musicfile.mp3.

In operation, for User 2 to playback the musicfile.mp3, successive portions of the encrypted and obfuscated music file are de-obfuscated, decrypted and played. In this manner, the musicfile.mp3 is never entirely decrypted at one time. In other words, the encrypted music file, E(TK, O1(musicfile.mp3)), is not completely decrypted, de-obfuscated and then played. Instead, a small portion of E(TK, O1(musicfile.mp3)) is decrypted and de-obfuscated in memory and sent to an audio device to be played. Then, a next small portion of E(TK, O1(musicfile.mp3)) is decrypted, de-obfuscated, and played, and so on. Continuity between each succeeding portion is ensured through proper decrypting, de-obfuscating, buffering, and timing. In this manner, only a small portion of the encrypted music file, E(TK, O1(musicfile.mp3)), is decrypted in memory at any given time.

Figure 7:
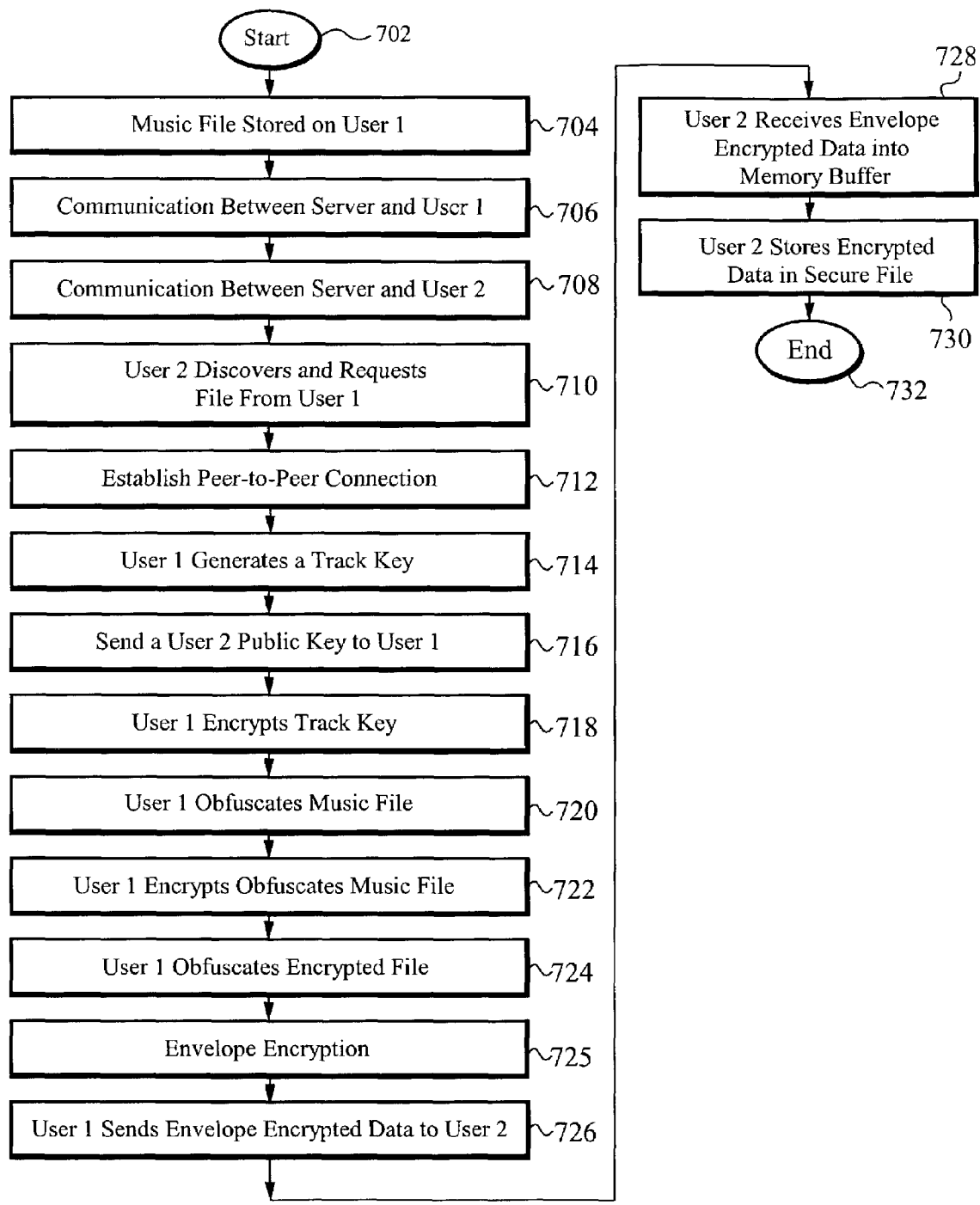
FIG. 7 illustrates a flowchart showing a preferred process of performing a secure peer-to-peer file transfer.

FIG. 7 illustrates a flowchart showing the preferred process of performing a secure peer-to-peer file transfer according to the present invention. The process illustrated in FIG. 7 is a file transfer between a User 1 and a User 2, both previously registered with an application server. As such, the client computers associated with each User 1 and 2 include proprietary client computer software used to facilitate the secure file transfer between User 1 and User 2. User 1 and User 2 are two of many users within a registered peer-to-peer environment. The secured peer-to-peer file transfer process begins at the step 702. At the step 704, a music file, beatles.mp3 is stored on the client computer of User 1. At the step 706, a protected communications channel is established between User 1 and the application server. The application server is notified by User 1 that the beatles.mp3 is available as a file to be shared. The application server adds beatles.mp3 to an existing index of all files available for transfer throughout the registered peer-to-peer file sharing environment. At the step 708, the User 2 accesses the application server to search the list of available files. At the step 710, a desired file is discovered, in this case the beatles.mp3 file, and the User 2 submits a request for the beatles.mp3 file to the application server. In response to the request, the application server 200 notifies User 1 that a file transfer request for beatles.mp3 has been initiated by User 2. User 1 transmits a transfer approval to the application server 200. The transfer approval is then transmitted to User 2 along with address information associated with beatles.mp3, which includes the address of User 1. User 2 then initiates a peer-to-peer connection with User 1 at the step 712. At the step 714, the application server notifies User 1 that beatles.mp3 is to be transferred to User 2. User 1 then generates a track key, TK. At the step 716, a User 2 public key, PK2, is sent to User 1. Preferably, PK2 is sent by the application server to User 1. Alternatively, PK2 is sent by User 2 to User 1. In this alternate embodiment, User 2 preferably sends PK2 to User 1 via the application server. At the step 718, User 1 encrypts TK using PK2, thereby forming E(PK2, TK). At the step 720, User 1 obfuscates the music file, beatles.mp3, using a first obfuscation algorithm, thereby forming O1(beatles.mp3). At the step 722, User 1 encrypts O1(beatles.mp3) using the track key, TK, thereby forming E(TK, O1(beatles.mp3)). At the step 724, User 1 obfuscates E(TK, O1(beatles.mp3)) using a second obfuscation algorithm, thereby forming O2(E(TK, O1(beatles.mp3))). At the step 725, envelope encryption is used to encrypt E(PK2, TK) and O2(E(TK, O1(beatles.mp3))). To perform envelope encryption, User 1 generates an envelope encryption key, EK, and sends EK to User 2 via the application server. User 1 uses EK to encrypt E(PK2, TK) and O2(E(TK, O1(beatles.mp3))) at the network layer. At the step 726, User 1 sends the envelope encrypted E(PK2, TK) and O2(E(TK, O1(beatles.mp3))) to User 2. At the step 728, User 2 receives the envelope encrypted E(PK2, TK) and O2(E(TK, O1(beatles.mp3))) in a memory buffer. As the envelope encrypted E(PK2, TK) and O2(E(TK, O1(beatles.mp3))) are received into the memory buffer, the envelope encryption is decrypted using EK sent to User 2 by User 1. At the step 730, O2(E(TK, O1(beatles.mp3))) is written to a data portion of a secure file stored on User 2. Once O2(E(TK, O1(beatles.mp3))) is completely written to the secure file, E(PK2, TK) is written to a header portion of the secure file. The secured peer-to-peer file transfer process ends at the step 732.

As a further means for managing the manner in which a file is shared within the peer-to-peer environment, business rules are used. Track properties are used to encode the business rules, which restrict how a file is used. Track properties define usage rules that include how many times a file can be played, what date a file can be played until, can the file be copied onto a CD or other media, can the file be transferred to another user, etc. Every file transfer includes a set of track properties. The track properties are determined by the application server. Each user can subscribe to their own specific track properties, for example a user can sign up for a service where every file they receive is able to be played for two weeks. The user can change their track properties as frequently as desired. Further, each file can include their own track properties, for example the enforcement of licensing agreements between whomever operates the application server and owners of the files which are to be shared within the peer-to-peer environment. Therefore, track properties can be associated with either a specific user or a specific file. Preferably, track properties associated with a specific song supercede track properties associated with a specific user.

Track properties are determined by the application server 200. Referring to the process illustrated in FIG. 7, the track properties for a particular file transfer are determined by the application server 200 once the User 2 requests a specific file, in this case beatles.mp3 from User 1. The application server 200 determines the track properties for this file transfer based on the track properties associated with beatles.mp3, if any, and the track properties associated with User 2. When the application server 200 notifies User 1 that a request for beatles.mp3 from User 2 is made, the application server 200 preferably provides the determined track properties for the beatles.mp3 transfer to User 1 over a secure communication channel. Alternatively, the application server 200 encrypts the track properties prior to sending them to User 1. When User 1 sends E(PK2, TK) and O2(E(TK, O1(beatles.mp3))) to User 2, User 1 preferably encrypts and sends the track properties associated with this file transfer to User 2. Preferably, the track properties are also envelope encrypted prior to the transfer to User 2. User 2 preferably stores the track properties in the secure file that includes the associated E(PK2, TK) and O2(E(TK, O1(beatles.mp3))). As discussed above, the track properties are preferably encrypted and stored in the header portion of the associated secure file. Alternatively, User 2 encrypts and stores the track properties separately from the secure file. Whenever User 2 plays the secure file, the associated track properties are also read and applied.

Alternatively, the track properties are encrypted and sent by the application server 200 directly to the client computer that is to receive the transferred file, which in the case described above in relation to FIG. 7 is User 2. User 2 then stores the received track properties as described above.

Figure 8:
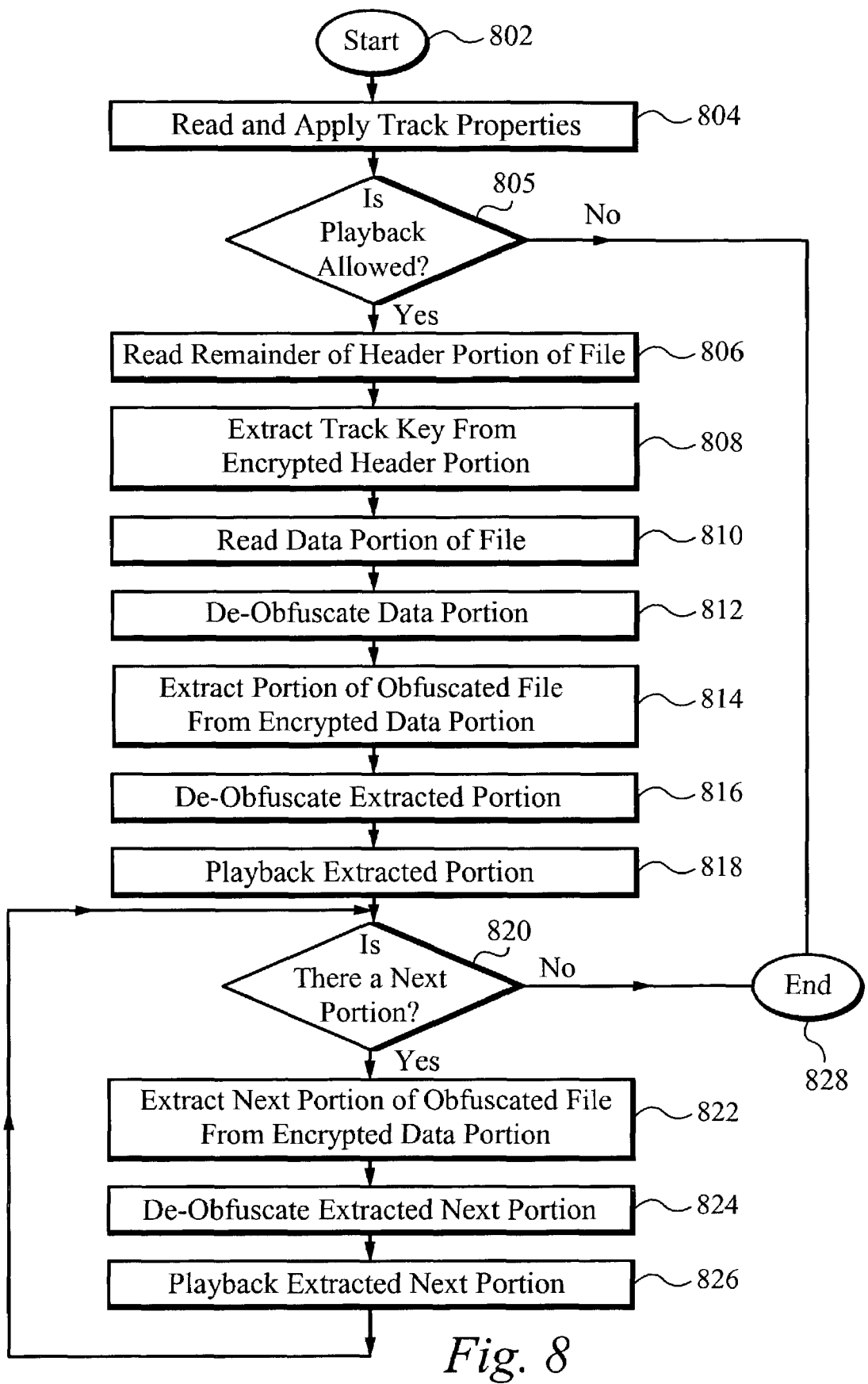
FIG. 8 illustrates a flowchart showing a preferred process of playing a secure file previously transferred within the secure peer-to-peer file sharing environment of the present invention.

FIG. 8 illustrates a flowchart showing the preferred process of playing a secure file previously transferred within the secure peer-to-peer file sharing environment of the present invention. The secure file is played from the client computer on which the secure file was received. The playback process begins at the step 802. At the step 804, the track properties are read from the header portion of the secure file. At the step 805, it is determined if the track properties allow the music file to be played. If it is determined at the step 802 that the music file can be played, then the remainder of the header portion of the secure file is read at the step 806. If it is determined at the step 802 that the track properties do not allow the music file to be played, then the playback process ends at the step 828. At the step 808, the encrypted track key, TK, is extracted from the header portion using a secret key, SK2, associated with the client computer. At the step 810, a first data portion of the secure file is read. At the step 812, the first data portion is de-obfuscated using a second de-obfuscation algorithm, DO2, embedded within the proprietary client software. After de-obfuscation, the first data portion is a portion of the encrypted music file, E(TK, O1(beatles.mp3)). At the step 814, the portion of the encrypted music file is extracted from the encrypted first data portion using the track key, TK. At this step, the extracted portion remains obfuscated. At the step 816, the extracted portion is de-obfuscated using a first de-obfuscation algorithm, DO1, embedded within the proprietary client software. At the step 818, the extracted and de-obfuscated portion of beatles.mp3 is played. At the step 820, it is determined if there is a next portion of beatles.mp3. If there is a next portion, then at the step 822, a next data portion of the secure file is read and the next portion of the encrypted music file is extracted from the encrypted next data portion using the track key, TK. At this step, the extracted next portion remains obfuscated. At the step 824, the extracted next portion is de-obfuscated using the first de-obfuscation algorithm, DO1. Preferably, the previous portion is overwritten in memory by the next portion. At the step 826, the extracted and de-obfuscated next portion of beatles.mp3 is played and the process returns to the step 824. If there is not a next portion of beatles.mp3 at the step 820, then the playback process ends at the step 828.

Referring to FIG. 6, User 3 accesses the application server 200 and searches the file transfer list. When User 3 finds a file to transfer, in this case musicfile.nap 620 located on User 2, User 3 makes a transfer request to the application server 200 for musicfile.nap 620 located on User 2. It is also possible that the User 3 makes a request for the musicfile.mp3 located on User 1, this case will be discussed below as an alternative scenario. In response to the request for the musicfile.nap 620 located on User 2, the application server 200 notifies User 2 that a file transfer request for musicfile.nap 620 has been initiated by User 3. User 2 transmits a transfer approval to the application server 200. The transfer approval is then transmitted to User 3 along with address information associated with musicfile.nap 620, which includes the address of User 2. User 3 then initiates a peer-to-peer connection with User 2. The application server 200 also generates the track properties associated with this file transfer and sends the track properties to User 2. Since the requested file, musicfile.nap 620, is already encrypted in secure file 620, User 2 does not generate a new track key for this file transfer. The existing TK is used.

User 3 will need TK to decrypt the encrypted music file, O1(musicfile.mp3). Since TK is encrypted within the header portion 605 of the secure file 620, User 2 decrypts TK using SK2. To then encrypt TK for transmission to User 3, PK3 is preferably sent by the application server 200 to User 2. Preferably, User 2 encrypts TK using PK3. The encrypted TK is represented by E(PK3, TK). The requested music file is already stored in a secure condition in the data portion 610 for transmission to User 3. As such, O2(E(TK, O1(musicfile.mp3))) from the data portion 610 and E(PK3, TK) are sent to User 3.

When sending E(PK3, TK) and O2(E(TK, O1(musicfile.mp3))) from User 2 to User 3 over the peer-to-peer connection, envelope encryption is preferably used as an additional security measure. Preferably, an envelope encryption key, EK, is generated by User 2 and sent via the application server 200 to User 3. Alternatively, the application server 200 generates EK and sends EK to User 2 and User 3. When sending E(PK3, TK) and O2(E(TK, O1(musicfile.mp3))) from User 2 to User 3 over the peer-to-peer connection, User 2 encrypts E(PK3, TK) and O2(E(TK, O1(musicfile.mp3))) using EK. The envelope encrypted E(PK3, TK) and O2(E(TK, O1(musicfile.mp3))) are then sent to User 3. User 3 decrypts E(PK3, TK) and O2(E(TK, O1(musicfile.mp3))) using its EK previously sent by User 2. The decryption preferably happens on-the-fly as the envelope encrypted E(PK3, TK) and O2(E(TK, O1(musicfile.mp3))) are received by User 3.

User 3 creates a secured file used to store the encrypted track key, E(PK3, TK), and the encrypted music file, O2(E(TK, O1(musicfile.mp3))). Preferably, the secure file resides within a file system on a hard disk drive. A secure file 650 is stored on the client computer 630, as illustrated in FIG. 6. The secure file 650 includes a header portion 630 and a data portion 640. The header portion 630 is to include the encrypted track key, E(PK3, TK), and the data portion 640 is to include the encrypted music file, O2(E(TK, O1(musicfile.mp3))). Preferably, E(PK3, TK) and O2(E(TK, O1(musicfile.mp3))) are serially streamed over the peer-to-peer connection between User 2 and User 3, and User 3 receives E(PK3, TK) first, followed by O2(E(TK, O1 (musicfile.mp3))) in a memory buffer. To write E(PK3, TK) and O2(E(TK, O1(musicfile.mp3))) to the header portion 630 and the data portion 640, respectively, of the secure file 650 within User 3, a blank header is first written into the header portion 630, and then O2(E(TK, O1(musicfile.mp3))) is written into the data portion 640. As O2(E(TK, O1(musicfile.mp3))) is downloaded to the memory buffer, the portion of O2(E(TK, O1(musicfile.mp3))) already received by the memory buffer is preferably being written to the data portion 640 of the secure file 650. Once O2(E(TK, O1(musicfile.mp3))) is written into the data portion 640, E(PK3, TK) is written into the header portion 630. Preferably, 02(E(TK, O1(musicfile.mp3))) is completely transferred and stored in the secure file 650 before E(PK3, TK) is stored in the secure file 650.

The associated track properties are preferably sent by User 2 to User 3 using envelope encryption and decryption as described above. The track properties are preferably encrypted and stored in the header portion 630 of the secure file 650. Alternatively, the track properties are sent by the application server 200 over a secure communication channel to User 3. Data portions 610 and 640 are identical, but header portions 605 and 630 are different. The secure file 650 is represented as a .nap file and is also indexed by the application server 200.

The playback process for User 3 is the same as that for User 2, except that the track key, TK, is extracted using the secret key, SK3, associated with User 3.

Figure 9:
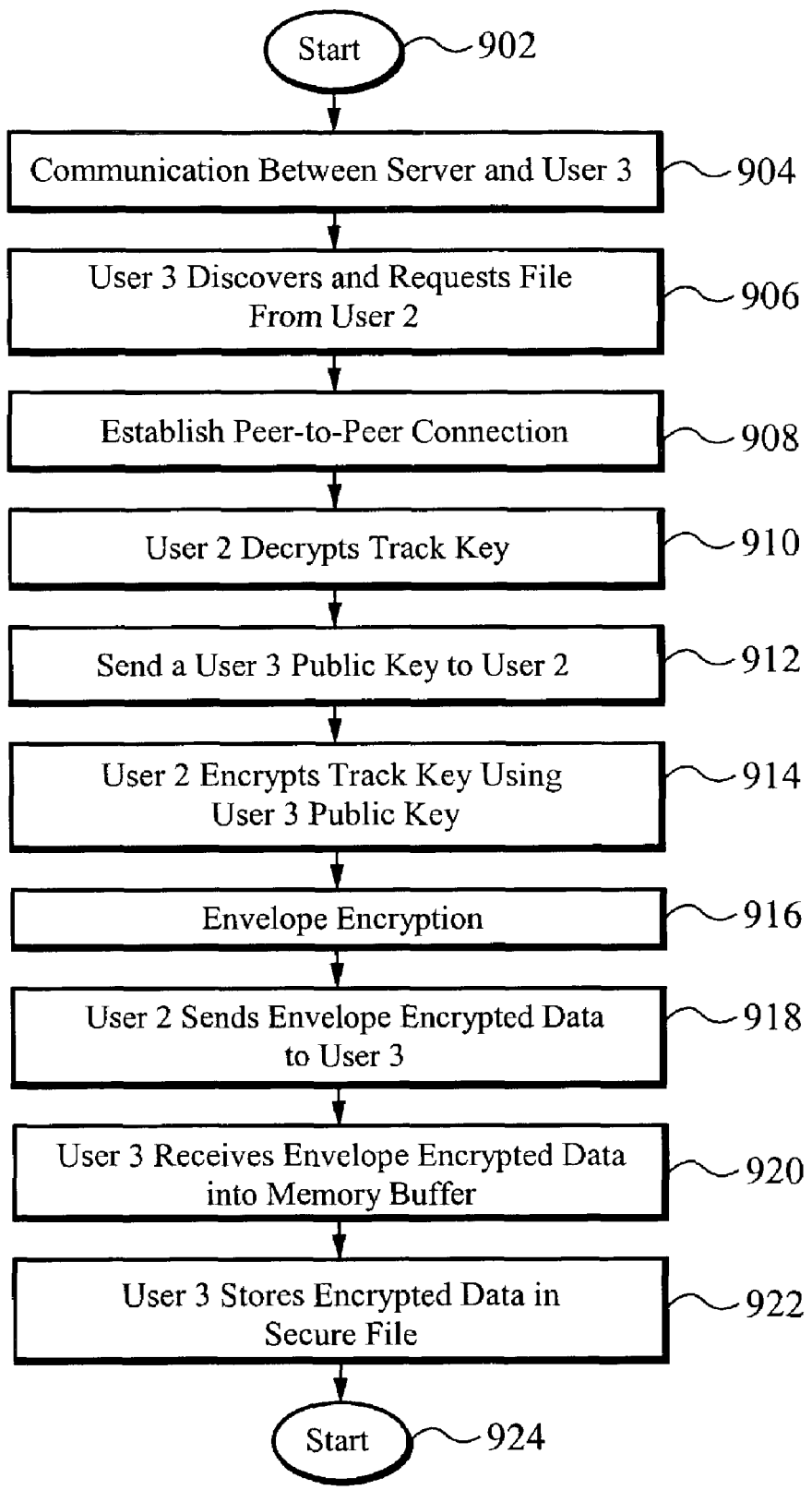
FIG. 9 illustrates a flowchart showing a process of performing a secure peer-to-peer file transfer of a secure file according to the present invention.

FIG. 9 illustrates a flowchart showing a process of performing a secure peer-to-peer file transfer of a secure file according to the present invention. The process illustrated in FIG. 9 is a file transfer between the User 2 and the User 3, both previously registered with an application server. As such, the client computers associated with each User 2 and 3 include proprietary client computer software used to facilitate the secure file transfer between User 2 and User 3. The file to be transferred is a secured file. For purposes of illustrating the process of FIG. 9, the secure file to be transferred is the secure file stored on User 2 associated with the process illustrated in FIG. 7. In this case, the header portion of the secure file includes E(PK2, TK) and the data portion includes O2(E(TK, O1(beatles.mp3))), which together form a beatles.nap file on User 2.

The secured peer-to-peer file transfer process begins at the step 902. At the step 904, the User 3 accesses the application server to search the list of available files. Upon finding a desired file, in this case the beatles.nap file stored on User 2, the User 3 submits a request for the beatles.nap to the application server at the step 906. In response to the request, the application server notifies User 2 that a file transfer request for beatles.nap has been initiated by User 3. User 2 transmits a transfer approval to the application server. The transfer approval is then transmitted to User 3 along with address information associated with beatles.nap, which is the address of User 2. User 3 then initiates a peer-to-peer connection with User 3 at the step 908.

User 3 will need TK to decrypt the encrypted data stored in beatles.nap. Since TK is encrypted within the header portion of the beatles.nap file, User 2 decrypts TK using SK2 at the step 910. To then encrypt TK for transmission to User 3, PK3 is preferably sent by the application server to User 2 at the step 912. At the step 914, User 2 encrypts TK using PK3. The encrypted TK is represented by E(PK3, TK). The data portion of the beatles.nap file stored on User 2, O2(E (TK, O1(musicfile.mp3))), is already stored in a secure condition for transmission to User 3.

At the step 916, envelope encryption is used to encrypt E(PK3, TK) and O2(E(TK, O1(beatles.mp3))). To perform envelope encryption, User 2 generates an envelope encryption key, EK, and sends EK to User 3 via the application server. User 2 uses EK to encrypt E(PK3, TK) and O2(E(TK, O1(beatles.mp3))) at the network layer. At the step 918, User 2 sends the envelope encrypted E(PK3, TK) and O2(E(TK, O1(beatles.mp3))) to User 3. At the step 920, User 3 receives the envelope encrypted E(PK3, TK) and O2(E(TK, O1(beatles.mp3))) in a memory buffer. As the envelope encrypted E(PK3, TK) and O2(E(TK, O1(beatles.mp3))) are received into the memory buffer, the envelope encryption is decrypted using EK sent to User 3 by User 2. At the step 922, O2(E(TK, O1(beatles.mp3))) is written to a data portion of a secure file stored on User 3. Once O2(E(TK, O1(beatles.mp3))) is completely written to the secure file, E(PK3, TK) is written to a header portion of the secure file. The secured peer-to-peer file transfer process ends at the step 924.

In the alternate case where User 3 requests musicfile.mp3 from User 1, the secure file transfer process from User 1 to User 3 is the same as the aforementioned process for transferring musicfile.mp3 from User 1 to User 2. The only difference being that a new track key is generated by User 1 in response to the request from User 3. To clarify, if the track key used in the transfer from User 1 to User 2 is represented by TK1, then the track key used in the transfer from User 1 to User 3 is represented by TK2. Further, in the case where User 2 receives the music file from User 1, then User 2 transfers the music file to User 3, the track key used in the transfer from User 2 to User 3 is TK1. Summarily, every time a music file is transferred and stored from a non-secure file to a secure file, for example from a .mp3 file to a nap file, a new track key is generated by the sending user.

It is understood that although the preferred method of securely transferring files is primarily described in reference to a peer-to-peer environment, the method of securely transferring files according to the present invention can be applied to distributed environments other than peer-to-peer. In general, the system and method of securely transferring files according to the present invention can be applied to a variety of distributed computing networks including computers of varied types and functionality.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention. Specifically, it will be apparent to those skilled in the art that while the preferred embodiment of the present invention is used to transfer a music file, the present invention could also be implemented to transfer any type of data file.

The invention claimed is:

1. A method of securing data within a peer-to-peer file sharing environment, the method comprising:
   a. generating a track key;
   b. sending a public key associated with a receiving device to a sending device;
   c. encrypting the track key using the receiving device public key;
   d. encrypting a data file using the track key, wherein the data file is stored on the sending device and encrypting the data file is performed by the sending device; and
   e. sending the encrypted track key and the encrypted data file to the receiving device, wherein the receiving device stores the encrypted track key and the encrypted data file as a secure file;
   f. sending a public key associated with a second receiving device to the receiving device;
   g. decrypting the encrypted track key using a secret key associated with the receiving device, wherein decrypting the encrypted track key is performed by the receiving device;
   h. encrypting the track key using the second receiving device public key thereby forming a second encrypted track key, wherein encrypting the track key to form the second encrypted track key is performed by the receiving device;
   i. sending the second encrypted track key to the second receiving device; and
   j. sending the encrypted data file to the second receiving device, wherein the second receiving device associates the second encrypted track key and the encrypted data file thereby forming a second received encrypted file.

2. The method according to claim 1 further comprising:
   f. decrypting the encrypted track key using a secret key associated with the receiving device, wherein decrypting the encrypted track key is performed by the receiving device;

g. decrypting the encrypted data file using the decrypted track key, wherein decrypting the encrypted data file is performed by the receiving device; and h. utilizing the decrypted data file by the receiving device.

3. The method according to claim 2 wherein decrypting the encrypted data file is performed by serially decrypting successive portions of the encrypted data file such that as a current portion of the encrypted data file is decrypted, the remaining portions, including those portions before and after the current portion, of the encrypted data file remain encrypted.

4. The method according to claim 2 wherein decrypting the encrypted data file is performed by decrypting selected portions of the encrypted data file such that as a current portion of the encrypted data file is decrypted, the remaining portions, including those portions before and after the current portion, of the encrypted data file remain encrypted.

5. The method according to claim 1 wherein the receiving device stores the secure file by completely storing the encrypted data file and then storing the encrypted track key.

6. The method according to claim 5 wherein the receiving device receives the encrypted track key and the encrypted data file in a memory buffer prior to storing the encrypted data file and the encrypted track key as the secure file.

7. The method according to claim 2 wherein the secret key and the public key associated with the receiving device are stored locally and secured by the receiving device.

8. The method according to claim 7 wherein the secret key and the public key are secured by the receiving device using encryption.

9. The method according to claim 1 further comprising:

f. encrypting the encrypted track key and the encrypted data file using envelope encryption prior to sending to the receiving device, wherein envelope encryption uses an envelope encryption key.

10. The method according to claim 9 further comprising:

g. decrypting the envelope encrypted track key and the envelope encrypted data file using the envelope encryption key, wherein decrypting the envelope encrypted track key and the envelope encrypted data file is performed by the receiving device;

h. decrypting the encrypted track key using a secret key associated with the receiving device, wherein decrypting the encrypted track key is performed by the receiving device;

i. decrypting the encrypted data file using the decrypted track key, wherein decrypting the encrypted data file is performed by the receiving device; and j. utilizing the decrypted data file by the receiving device.

11. The method according to claim 9 wherein encrypting using envelope encryption comprises:

1. generating the envelope encryption key by the sending device;

2. sending the envelope encryption key to the receiving device via an application server; and 3. encrypting the encrypted track key and the encrypted data file using the envelope encryption key.

12. The method according to claim 9 wherein encrypting using envelope encryption comprises:

1. generating the envelope encryption key by an application server;

2. sending the envelope encryption key to the sending device and to the receiving device; and 3. encrypting the encrypted track key and the encrypted data file using the envelope encryption key.

13. The method according to claim 1 further comprising:

k. decrypting the second encrypted track key using a secret key associated with the second receiving device, wherein decrypting the second encrypted track key is performed by the second receiving device;

l. decrypting the encrypted data file using the decrypted track key, wherein decrypting the encrypted data file is performed by the second receiving device; and m. utilizing the decrypted data file by the second receiving device.

14. The method according to claim 1 further comprising:

k. encrypting the second encrypted track key and the encrypted data file using envelope encryption prior to sending to the second receiving device, wherein envelope encryption uses a second envelope encryption key.

15. The method according to claim 14 wherein encrypting using envelope encryption comprises:

l. decrypting the envelope encrypted second encrypted track key and the envelope encrypted data file using the second envelope encryption key, wherein decrypting is performed by the second receiving device;

m. decrypting the second encrypted track key using a secret key associated with the second receiving device, wherein decrypting the second encrypted track key is performed by the second receiving device;

n. decrypting the encrypted data file using the decrypted track key, wherein decrypting the encrypted data file is performed by the second receiving device; and o. utilizing the decrypted data file by the second receiving device.

16. The method according to claim 14 wherein encrypting using envelope encryption comprises:

1. generating the second envelope encryption key by the receiving device;

2. sending the second envelope encryption key to the second receiving device via an application server; and 3. encrypting the encrypted track key and the encrypted data file using the second envelope encryption key.

17. The method according to claim 14 wherein encrypting using envelope encryption comprises:

1. generating the second envelope encryption key by an application server;

2. sending the second envelope encryption key to the receiving device and to the second receiving device; and 3. encrypting the encrypted track key and the encrypted data file using the second envelope encryption key.

18. The method according to claim 1 wherein the second receiving device public key is sent to the receiving device by an application server.

19. The method according to claim 1 wherein the second receiving device public key is sent to the receiving device by the second receiving device.

20. The method according to claim 19 wherein the second receiving device public key is sent to the receiving device by the second receiving device via an application server.

21. The method according to claim 1 wherein the sending device and the receiving device are peer devices.

22. The method according to claim 1 wherein the data file is an audio file.

23. The method according to claim 22 wherein the audio file is selected from a group including MP3, Ogg Vorbis, WMA, AAC and ATRAC-3.

24. The method according to claim 1 further comprising associating a set of business rules with the secure file wherein the business rules define constraints under which the secure file is read, copied, and distributed.

25. The method according to claim 24 wherein the business rules are encrypted and stored separately from the associated secure file.

26. The method according to claim 24 wherein the business rules are encrypted and stored with the associated secure file.

27. The method according to claim 24 wherein the business rules further define transactional consequences associated with each file transfer from the sending device to the receiving device.

28. The method according to claim 24 further comprising:
   f. decrypting the encrypted track key using a secret key associated with the receiving device, wherein decrypting the encrypted track key is performed by the receiving device;
   g. decrypting the encrypted data file using the decrypted track key, wherein decrypting the encrypted data file is performed by the receiving device; and
   h. utilizing the decrypted data file by the receiving device, wherein utilizing the decrypted data file is constrained by the associated set of business rules.

29. The method according to claim 28 wherein the business rules are generated by an application server coupled to the sending device and the business rules are transmitted from the application server to the receiving device via the sending device and the business rules are encrypted and stored with the associated secure file.

30. The method according to claim 28 wherein the business rules are generated by an application server coupled to the sending device and to the receiving device and the business rules are transmitted from the application server to the receiving device where the business rules are encrypted and stored with the associated secure file.

31. The method according to claim 1 wherein the receiving device public key is sent to the sending device by an application server.

32. The method according to claim 1 wherein the receiving device public key is sent to the sending device by the receiving device.

33. The method according to claim 32 wherein the receiving device public key is sent to the sending device by the receiving device via an application server.

34. The method according to claim 1 wherein the encrypted track key and the encrypted data file are serially streamed from the sending device to the receiving device as part of the same data stream.

35. The method according to claim 1 wherein the encrypted track key and the encrypted data file are separately streamed from the sending device to the receiving device.

36. The method according to claim 1 wherein the track key is generated by the sending device.

37. The method according to claim 1 wherein the track key is generated by an application server coupled to the sending device.

38. The method according to claim 1 wherein the track key is included within a header portion of the secure file.

39. The method according to claim 38 wherein the header portion further comprises one or more of metadata and business rules associated with the secure file.

40. A method of securing data within a peer-to-peer file sharing environment, the method comprising:
   a. obfuscating a data file stored on a sending device by the sending device;
   b. generating a track key;
   c. sending a public key associated with a receiving device to the sending device;
   d. encrypting the track key using the receiving device public key;
   e. encrypting the obfuscated data file using the track key thereby forming an encrypted data file, wherein encrypting the obfuscated data file is performed by the sending device;
   f. obfuscating the encrypted data file by the sending device;
   g. sending the obfuscated encrypted data file and the encrypted track key to the receiving device, wherein the receiving device stores the encrypted track key and the obfuscated encrypted data file as a secure file; and
   h. encrypting the encrypted track key and the obfuscated encrypted data file using envelope encryption prior to sending to the receiving device, wherein envelope encryption includes an envelope encryption key.

41. The method according to claim 40 further comprising:
   h. decrypting the encrypted track key using a secret key associated with the receiving device, wherein decrypting the encrypted track key is performed by the receiving device;
   i. de-obfuscating the obfuscated encrypted data file by the receiving device;
   j. decrypting the encrypted data file using the decrypted track key to recover the obfuscated data file, wherein decrypting the encrypted data file is performed by the receiving device;
   k. de-obfuscating the obfuscated data file by the receiving device; and
   l. utilizing the de-obfuscated data file by the receiving device.

42. The method according to claim 41 wherein decrypting the encrypted data file is performed by serially decrypting successive portions of the encrypted data file such that as a current portion of the encrypted data file is decrypted, the remaining portions, including those portions before and after the current portion, of the encrypted data file remain encrypted.

43. The method according to claim 41 wherein decrypting the encrypted data file is performed by decrypting selected portions of the encrypted data file such that as a current portion of the encrypted data file is decrypted, the remaining portions, including those portions before and after the current portion, of the encrypted data file remain encrypted.

44. The method according to claim 40 wherein the receiving device stores the secure file by completely storing the obfuscated encrypted data file and then storing the encrypted track key.

45. The method according to claim 44 wherein the receiving device receives the encrypted track key and the obfuscated encrypted data file in a memory buffer prior to storing the obfuscated encrypted data file and the encrypted track key as the secure file.

46. The method according to claim 41 wherein the secret key and the public key associated with the receiving device are stored locally and secured by the receiving device.

47. The method according to claim 46 wherein the secret key and the public key are secured by the receiving device using obfuscation and encryption.

48. The method according to claim 40 further comprising:
   i. decrypting the envelope encrypted track key and the envelope encrypted data file using the envelope encryption key, wherein decrypting the envelope encrypted track key and the envelope encrypted data file is performed by the receiving device;

j. decrypting the encrypted track key using a secret key associated with the receiving device, wherein decrypting the encrypted track key is performed by the receiving device;
k. de-obfuscating the obfuscated encrypted data file by the receiving device;
l. decrypting the encrypted data file using the decrypted track key to recover the obfuscated data file, wherein decrypting the encrypted data file is performed by the receiving device;
m. de-obfuscating the obfuscated data file by the receiving device; and
n. utilizing the decrypted data file by the receiving device.

49. The method according to claim 40 wherein encrypting using envelope encryption comprises:
   1. generating the envelope encryption key by the sending device;
   2. sending the envelope encryption key to the receiving device via an application server; and
   3. encrypting the encrypted track key and the obfuscated encrypted data file using the envelope encryption key.

50. The method according to claim 40 wherein encrypting using envelope encryption comprises:
   1. generating the envelope encryption key by an application server;
   2. sending the envelope encryption key to the sending device and to the receiving device; and
   3. encrypting the encrypted track key and the obfuscated encrypted data file using the envelope encryption key.

51. The method according to claim 40 further comprising:
h. sending a public key associated with a second receiving device to the receiving device;
i. decrypting the encrypted track key using a secret key associated with the receiving device, wherein decrypting the encrypted track key is performed by the receiving device;
j. encrypting the track key using the second receiving device public key thereby forming a second encrypted track key, wherein encrypting the track key to form the second encrypted track key is performed by the receiving device;
k. sending the second encrypted track key to the second receiving device; and
l. sending the obfuscated encrypted data file to the second receiving device, wherein the second receiving device stores the second encrypted track key and the obfuscated encrypted data file as a second secure file.

52. The method according to claim 51 further comprising:
m. decrypting the second encrypted track key using a secret key associated with the second receiving device, wherein decrypting the second encrypted track key is performed by the second receiving device;
n. de-obfuscating the obfuscated encrypted data file by the second receiving device;
o. decrypting the encrypted data file using the decrypted track key to recover the obfuscated data file, wherein decrypting the encrypted data file is performed by the second receiving device;
p. de-obfuscating the obfuscated data file by the second receiving device; and
q. utilizing the decrypted data file by the second receiving device.

53. The method according to claim 51 further comprising:
m. encrypting the second encrypted track key and the obfuscated encrypted data file using envelope encryption prior to sending to the second receiving device, wherein envelope encryption uses a second envelope encryption key.

54. The method according to claim 53 further comprising:
n. decrypting the envelope encrypted second encrypted track key and the envelope encrypted data file using the second envelope encryption key, wherein decrypting is performed by the second receiving device;
o. decrypting the second encrypted track key using a secret key associated with the second receiving device, wherein decrypting the second encrypted track key recovers the track key and is performed by the second receiving device;
p. de-obfuscating the obfuscated encrypted data file by the second receiving device;
q. decrypting the encrypted data file using the decrypted track key, wherein decrypting the encrypted data file is performed by the second receiving device;
r. de-obfuscating the obfuscated data file by the second receiving device; and
s. utilizing the decrypted data file by the second receiving device.

55. The method according to claim 53 wherein encrypting using envelope encryption comprises:
   1. generating the second envelope encryption key by the receiving device;
   2. sending the second envelope encryption key to the second receiving device via an application server; and
   3. encrypting the second encrypted track key and the obfuscated encrypted data file using the second envelope encryption key.

56. The method according to claim 53 wherein encrypting using envelope encryption comprises:
   1. generating the second envelope encryption key by an application server;
   2. sending the second envelope encryption key to the receiving device and to the second receiving device; and
   3. encrypting the second encrypted track key and the obfuscated encrypted data file using the second envelope encryption key.

57. The method according to claim 51 wherein the second receiving device public key is sent to the receiving device by an application server.

58. The method according to claim 51 wherein the second receiving device public key is sent to the receiving device by the second receiving device.

59. The method according to claim 58 wherein the second receiving device public key is sent to the receiving device by the second receiving device via an application server.

60. The method according to claim 51 wherein the sending device, the receiving device, and the second receiving device are peer devices.

61. The method according to claim 40 wherein the data file is an audio file.

62. The method according to claim 61 wherein the audio file is selected from a group including MP3, Ogg Vorbis, WMA, AAC and ATRAC-3.

63. The method according to claim 40 further comprising associating a set of business rules with the received secure file wherein the business rules define constraints under which the received secure file is read, copied, and distributed.

64. The method according to claim 63 wherein the business rules are encrypted and stored separately from the associated secure file.

65. The method according to claim 63 wherein the business rules are encrypted and stored with the associated secure file.

66. The method according to claim 63 wherein the business rules further define transactional consequences associated with each file transfer from the sending device to the receiving device.

67. The method according to claim 63 further comprising:
   h. decrypting the encrypted track key using a secret key associated with the receiving device, wherein decrypting the encrypted track key is performed by the receiving device;
   m. de-obfuscating the obfuscated encrypted data file by the receiving device;
   n. decrypting the encrypted data file using the decrypted track key to recover the obfuscated data file, wherein decrypting the encrypted data file is performed by the receiving device;
   k. de-obfuscating the obfuscated data file by the receiving device; and
   l. utilizing the de-obfuscated data file by the receiving device, wherein utilizing the obfuscated data file is constrained by the associated set of business rules.

68. The method according to claim 40 wherein obfuscating the data file is performed by applying a first mathematical transform to the data file.

69. The method according to claim 68 wherein obfuscating the encrypted data file is performed by applying a second mathematical transform to the encrypted data file.

70. The method according to claim 67 wherein the business rules are generated by an application server coupled to the sending device and the business rules are transmitted from the application server to the receiving device via the sending device and the business rules are stored with the associated secure file.

71. The method according to claim 67 wherein the business rules are generated by an application server coupled to the sending device and to the receiving device and the business rules are transmitted from the application server to the receiving device where the business rules are encrypted and stored with the associated secure file.

72. The method according to claim 40 wherein the receiving device public key is sent to the sending device by an application server.

73. The method according to claim 40 wherein the receiving device public key is sent to the sending device by the receiving device.

74. The method according to claim 73 wherein the receiving device public key is sent to the sending device by the receiving device via an application server.

75. The method according to claim 40 wherein the encrypted track key and the obfuscated encrypted data file are serially streamed from the sending device to the receiving device as part of the same data stream.

76. The method according to claim 40 wherein the encrypted track key and the obfuscated encrypted data file are separately streamed from the sending device to the receiving device.

77. The method according to claim 40 wherein the track key is generated by the sending device.

78. The method according to claim 40 wherein the track key is generated by an application server coupled to the sending device.

79. The method according to claim 40 wherein the track key is included within a header portion of the secure file.

80. The method according to claim 79 wherein the header portion further comprises one or more of metadata and business rules associated with the secure file.

81. A method of encrypting and transferring data comprising:
   a. encrypting a track key using a public key associated with a receiving device;
   b. encrypting a data file using the track key;
   c. sending the encrypted track key and the encrypted data file from a sending device to the receiving device, wherein the receiving device associates the encrypted track key and the encrypted data file thereby forming a secure file;
   d. decrypting the encrypted track key using a secret key associated with the receiving device; and
   e. decrypting, the encrypted data file using the decrypted track key; and utilizing the decrypted data file by the receiving device, wherein decrypting the encrypted track key and decrypting the encrypted data file are performed by the receiving device, and wherein decrypting the encrypted data file is performed by serially decrypting successive portions of the encrypted data file such that as a current portion of the encrypted data file is decrypted, the remaining portions, including those portions before and after the current portion, of the encrypted data file remain encrypted.

82. The method according to claim 81 wherein the track key is generated by the sending device.

83. The method according to claim 81 wherein the track key is generated by an application server coupled to the sending device.

84. The method according to claim 81 wherein the track key is included within a header portion of the secure file.

85. The method according to claim 84 wherein the header portion further comprises one or more of metadata and business rules associated with the secure file.

86. The method according to claim 82 wherein the public key is provided from the receiving device to the sending device and the sending device encrypts the track key using the public key.

87. The method according to claim 82 wherein the public key is provided from an application server to the sending device and the sending device encrypts the track key using the public key, wherein the application server is coupled to the sending device and to the receiving device.

88. The method according to claim 81 wherein the data file is stored on the sending device and the sending device encrypts the data file using the track key.

89. A method of encrypting and transferring data comprising:
   a. encrypting a track key using a public key associated with a receiving device;
   b. encrypting a data file using the track key;
   c. sending the encrypted track key and the encrypted data file from a sending device to the receiving device, wherein the receiving device associates the encrypted track key and the encrypted data file thereby forming a secure file;
   d. decrypting the encrypted track key using a secret key associated with the receiving device;
   e. decrypting, the encrypted data file using the decrypted track key; and
   f. utilizing the decrypted data file by the receiving device; wherein decrypting the encrypted track key and decrypting the encrypted data file are performed by the receiving device, and wherein decrypting the encrypted data file is performed by decrypting selected portions of the encrypted data file such that as a current portion of the encrypted data file is decrypted, the remaining portions, including those portions before and after the current portion, of the encrypted data file remain encrypted.

90. The method according to claim 89 wherein the public key and the secret key are stored locally and secured by the receiving device.

91. A method of encrypting and transferring data comprising:
  a. encrypting a track key using a public key associated with a receiving device;
  b. encrypting a data file using the track key;
  c. sending the encrypted track key and the encrypted data file from a sending device to the receiving device, wherein the receiving device associates the encrypted track key and the encrypted data file thereby forming a secure file;
  d. decrypting the encrypted track key using a secret key associated with the receiving device;
  e. encrypting the track key using a public key associated with a second receiving device thereby forming a second encrypted track key, wherein encrypting the track key to form the second encrypted track key is performed by the receiving device;
  f. sending the second encrypted track key and the encrypted data file to the second receiving device, wherein the second receiving device associates the second encrypted track key and the encrypted data file thereby forming a second secure file.

92. The method according to claim 91 further comprising:
  g. decrypting the second encrypted track key using a secret key associated with the second receiving device, wherein decrypting the second encrypted track key is performed by the second receiving device;
  h. decrypting the encrypted data file using the decrypted track key, wherein decrypting the encrypted data file is performed by the second receiving device; and
  i. utilizing the decrypted data file by the second receiving device.

93. The method according to claim 91 wherein the sending device, the receiving device, and the second receiving device are peer devices.

94. The method according to claim 81 wherein the data file is an audio file.

95. The method according to claim 81 further comprising associating a set of business rules with the secure file wherein the business rules define constraints under which the secure file is read, copied, and distributed.

96. The method according to claim 95 further comprising:
  d. decrypting the encrypted track key using a public key associated with the receiving device, wherein decrypting the track key is performed by the receiving device;
  e. decrypting the encrypted data file using the decrypted track key, wherein decrypting the encrypted data file is performed by the receiving device; and
  f. utilizing the decrypted data file by the receiving device, wherein utilizing the decrypted data file is constrained by the associated set of business rules.

97. The method according to claim 81 further comprising:
  d. obfuscating the data file prior to encrypting the data file using the track key; and
  e. obfuscating the encrypted and obfuscated data file prior to sending to the receiving device.

98. The method according to claim 97 further comprising:
  f. encrypting the encrypted track key and the obfuscated encrypted data file using envelope encryption prior to sending to the receiving device, wherein envelope encryption includes an envelope encryption key.

99. The method according to claim 98 further comprising:
  g. decrypting the envelope encrypted track key and the envelope encrypted data file using the envelope encryption key, wherein decrypting the envelope encrypted track key and the envelope encrypted data file is performed by the receiving device;
  h. decrypting the encrypted track key using a secret key associated with the receiving device, wherein decrypting the encrypted track key is performed by the receiving device;
  i. de-obfuscating the obfuscated encrypted data file by the receiving device;
  j. decrypting the encrypted data file using the decrypted track key to recover the obfuscated data file, wherein decrypting the encrypted data file is performed by the receiving device;
  k. de-obfuscating the obfuscated data file by the receiving device; and
  l. utilizing the decrypted data file by the receiving device.

100. A system for securing data within a peer-to-peer file sharing environment, the system comprising:
  a. a receiving device; and
  b. a sending device coupled to the receiving device for encrypting a track key using a public key associated with the receiving device, encrypting a data file using the track key, and sending the encrypted track key and the encrypted data file to the receiving device, wherein the receiving device stores the encrypted track key and the encrypted data file as a secure file; and further comprising a second receiving device coupled to the receiving device, wherein the receiving device decrypts the encrypted track key using a secret key associated with the receiving device, encrypts the track key using a public key associated with the second receiving device thereby forming a second encrypted track key, and sends the second encrypted track key and the encrypted data file to the second receiving device, wherein the second receiving device stores the second encrypted track key and the encrypted data file as a second secure file.

101. The system according to claim 100 wherein the track key is generated by the sending device.

102. The system according to claim 100 wherein the track key is generated by an application server coupled to the sending device.

103. The system according to claim 100 wherein the track key is included within a header portion of the secure file.

104. The system according to claim 103 wherein the header portion further comprises one or more of metadata and business rules associated with the secure file.

105. The system according to claim 100 wherein the data file is stored on the sending device.

106. The system according to claim 100 wherein the public key is provided from an application server to the sending device, wherein the application server is coupled to the sending device and to the receiving device.

107. The system according to claim 100 wherein the receiving device decrypts the encrypted track key using a secret key associated with the receiving device, decrypts the encrypted data file using the decrypted track key, and utilizes the decrypted data file.

108. The system according to claim 107 wherein decrypting the encrypted data file is performed by serially decrypting successive portions of the encrypted data file such that as a current portion of the encrypted data file is decrypted, the remaining portions, including those portions before and after the current portion, of the encrypted data file remain encrypted.

109. The system according to claim 107 wherein decrypting the encrypted data file is performed by decrypting selected portions of the encrypted data file such that as a current portion of the encrypted data file is decrypted, the remaining portions, including those portions before and after the current portion, of the encrypted data file remain encrypted.

110. The system according to claim 100 wherein the public key and the secret key are stored locally and secured by the receiving device.

111. The system according to claim 100 wherein the second receiving device decrypts the second encrypted track key using a secret key associated with the second receiving device, decrypts the encrypted data file using the decrypted track key, and utilizes the decrypted data file.

112. The system according to claim 111 wherein the sending device, the receiving device, and the second receiving device are peer devices.

113. The system according to claim 100 wherein the data file is an audio file.

114. The system according to claim 100 further comprising a set of business rules associated with the secure file, wherein the business rules define constraints under which the secure file is read, copied, and distributed.

115. The system according to claim 114 wherein the receiving device decrypts the encrypted track key using a public key associated with the receiving device, decrypts the encrypted data file using the decrypted track key, and utilizes the decrypted data file, wherein utilizing the decrypted data file is constrained by the associated set of business rules.

116. The system according to claim 100 wherein the sending device obfuscates the data file prior to encrypting the data file using the track key, and obfuscates the encrypted and obfuscated data file prior to sending to the receiving device.

117. The system according to claim 116 wherein the sending device encrypts the encrypted track key and the obfuscated encrypted data file using envelope encryption prior to sending to the receiving device, wherein envelope encryption uses an envelope encryption key.

118. The system according to claim 117 wherein the receiving device decrypts the envelope encrypted track key and the envelope encrypted data file using the envelope encryption key, decrypts the encrypted track key using a secret key associated with the receiving device, de-obfuscates the obfuscated encrypted data file, decrypts the encrypted data file using the decrypted track key to recover the obfuscated data file, de-obfuscates the obfuscated data file, and utilizes the decrypted data file.

* * * * *